(12) United States Patent
Nakashima et al.

(10) Patent No.: US 11,230,647 B2
(45) Date of Patent: Jan. 25, 2022

(54) PHOTOCURABLE CLEAR INK COMPOSITION FOR INKJET PRINTING

(71) Applicant: SAKATA INX CORPORATION, Osaka (JP)

(72) Inventors: Okinori Nakashima, Osaka (JP); Takuya Myose, Osaka (JP); Takuya Okamoto, Osaka (JP); Kazuhiro Fuke, Osaka (JP); Ryoichi Nitta, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 26 days.

(21) Appl. No.: 16/319,787

(22) PCT Filed: Jun. 30, 2017

(86) PCT No.: PCT/JP2017/024233
§ 371 (c)(1),
(2) Date: Jan. 22, 2019

(87) PCT Pub. No.: WO2018/030027
PCT Pub. Date: Feb. 15, 2018

(65) Prior Publication Data
US 2019/0169454 A1    Jun. 6, 2019

(30) Foreign Application Priority Data

Aug. 9, 2016  (JP) .............................. JP2016-156931

(51) Int. Cl.
| | | |
|---|---|---|
| *C09D 11/101* | (2014.01) | |
| *C09D 11/38* | (2014.01) | |
| *C09D 11/32* | (2014.01) | |
| *C09D 11/36* | (2014.01) | |
| *B41M 5/00* | (2006.01) | |
| *C08F 220/58* | (2006.01) | |
| *C08F 224/00* | (2006.01) | |
| *C08K 3/22* | (2006.01) | |
| *C08K 3/36* | (2006.01) | |
| *C08K 5/101* | (2006.01) | |
| *C09D 11/322* | (2014.01) | |

(52) U.S. Cl.
CPC .............. *C09D 11/38* (2013.01); *B41M 5/00* (2013.01); *C08F 220/58* (2013.01); *C08F 224/00* (2013.01); *C08K 3/22* (2013.01); *C08K 3/36* (2013.01); *C08K 5/101* (2013.01); *C09D 11/32* (2013.01); *C09D 11/322* (2013.01); *C09D 11/36* (2013.01); *C08K 2003/2227* (2013.01)

(58) Field of Classification Search
CPC ..... C09D 11/101; C09D 11/322; C09D 11/32; C09D 11/38; C09D 11/36; C08K 2003/2227; C08K 5/101; C08K 3/36; C08K 3/22; C08F 224/00; C08F 220/58; B41M 5/00; B41J 2/01
See application file for complete search history.

(56) References Cited

U.S. PATENT DOCUMENTS

| | | | |
|---|---|---|---|
| 2009/0124720 A1* | 5/2009 | Tsuchiya ................... | C08F 2/48 522/182 |
| 2014/0178640 A1 | 6/2014 | Jauzein et al. | |

FOREIGN PATENT DOCUMENTS

| | | |
|---|---|---|
| JP | 2008081594 A | 4/2008 |
| JP | 2010106085 A | 5/2010 |
| JP | 2011213931 A | 10/2011 |
| JP | 2011219648 A | 11/2011 |
| JP | 2013121992 A | 6/2013 |
| JP | 2014172986 A | 9/2014 |
| JP | 2015057330 A | 3/2015 |
| JP | 2015081294 A | 4/2015 |
| JP | 2016108448 A | 6/2016 |

OTHER PUBLICATIONS

Frohlich et al. Assessment of the Dispersion Quality of Refractive Index-matched Nanodispersions. Appl. Rheol. 26 (2016) 65050. pp. 1-10 (Year: 2016).*
In re Lindner, 457 F.2d 506, 59 C.C.P.A. 920, 173 U.S.P.Q. 356 (C.C.P.A. 1972), (Year: 1972).*
In re Dial, 326 F.2d 430, 51 C.C.P.A. 866, 140 U.S.P.Q. 244 (C.C.P.A. 1964), (Year: 1964).*
International Search Report (ISR) dated Aug. 22, 2017, issued for International application No. PCT/JP2017/024233.
Extended European Search Report (EESR) dated Mar. 13, 2020, issued for European counterpart patent application No. EP17839101.7 (6 pages).
Notification Concerning Transmittal of International Preliminary Report on Patentability (PCT/IB326) and Notification of Transmittal of Translation of the International Preliminary Report on Patentability (PCT/IB/338) dated Feb. 21, 2019, with International Preliminary Report on Patentability (PCT/IB/373) and Written Opinion of the International Searching Authority (PCT/ISA/237), for corresponding international application PCT/JP2017/024233, (22 pages).

* cited by examiner

*Primary Examiner* — Sanza L. McClendon
(74) *Attorney, Agent, or Firm* — Law Office of Katsuhiro Arai

(57) ABSTRACT

Clear inks are prone to heat-induced micro-gelling that can cause their storage stability to drop, and micro-gelling may also occur in clear inks with the passage of time, in which case their inkjet discharge property may drop. As a solution, a photocurable clear ink composition for inkjet printing is provided, which contains a photopolymerizable compound, a photopolymerization initiator, and an inorganic filler of 1 to 200 nm in average grain size accounting for 0.05 to 5.0 percent by mass in the composition, and whose visible light transmission factor is 30% or higher.

12 Claims, No Drawings

PHOTOCURABLE CLEAR INK COMPOSITION FOR INKJET PRINTING

CROSS-REFERENCE TO RELATED APPLICATIONS

This application is the U.S. National Phase under 35 U.S.C. § 371 of International Application PCT/JP2017/024233, filed Jun. 30, 2017, which claims priority to Japanese Patent Application No. 2016-156931, filed Aug. 9, 2016. The International Application was published under PCT Article 21(2) in a language other than English.

TECHNICAL FIELD

The present invention relates to a photocurable clear ink composition for inkjet printing.

BACKGROUND ART

Among the known photocurable clear ink compositions for inkjet printing are the compositions described in Patent Literature 1. These compositions are clear ink compositions free from coloring pigments or extender pigments, containing only curable components, curing agents, and other additives. By printing such clear ink composition on top of the surface of images and text recorded with color inks, a matte finish can be added to the surface of the recorded images and text.

Also, the photocurable clear ink compositions for inkjet printing described in Patent Literature 2 are free from metal powders or coloring agents, and by printing such clear ink composition before other inks containing metal powders are printed, the smoothness of the recording medium can be improved, and excellent gloss and luxurious texture can be added to the inks containing metal powders.

Also, as described in Patent Literature 3, the art of improving abrasion resistance of photopolymerizable inkjet coloring inks by blending in silica and thereby increasing the hardness of the cured inks is known and, as described in Patent Literature 4, the art of effectively preventing the UV-induced fading of photocurable inkjet inks by blending in zinc oxide, cerium oxide, or rutile titanium oxide as an inorganic UV absorbent is also known.

BACKGROUND ART LITERATURE

Patent Literature

Patent Literature 1: Japanese Patent Laid-open No. 2015-057330
Patent Literature 2: Japanese Patent Laid-open No. 2014-172986
Patent Literature 3: Japanese Patent Laid-open No. 2015-081294
Patent Literature 4: Japanese Patent Laid-open No. 2011-219648

SUMMARY OF THE INVENTION

Problems to be Solved by the Invention

Photocurable clear ink compositions for inkjet printing, which are cured by light from LED and other light sources, require high reactivity because they form a cured coating film as a result of acrylate radical polymerization. On the other hand, ink compositions having high reactivity tend to have high reactivity to heat, as well. Ink compositions having high reactivity to heat are less stabile under heat, resulting in lower storage stability of the inks. Accordingly, ink compositions must have high reactivity to light and low reactivity to heat.

In particular, clear inks are prone to heat-induced microgelling that can cause their storage stability to drop, and micro-gelling may also occur in clear inks with the passage of time, in which case their inkjet discharge property may drop.

Means for Solving the Problems

The inventors of the present invention developed the present invention as a solution to the aforementioned problems by finding that these problems can be solved by adopting a photocurable clear ink composition for inkjet printing described as:
1. a photocurable clear ink composition for inkjet printing which contains a photopolymerizable compound, a photopolymerization initiator, and an inorganic filler of 1 to 200 nm in average grain size accounting for 0.05 to 5.0 percent by mass in the composition, and whose visible light transmission factor is 30% or higher;
2. a photocurable clear ink composition for inkjet printing according to 1, wherein the inorganic filler is silica and/or aluminum oxide;
3. a photocurable clear ink composition for inkjet printing according to 1 or 2, wherein an amino and/or acid group-containing pigment dispersant is contained;
4. a photocurable clear ink composition for inkjet printing according to any one of 1 to 3, wherein an amide group-containing monofunctional monomer and benzyl acrylate are contained, as the photopolymerizable compound, by 50 to 75 percent by mass in total quantity in the photocurable clear ink composition for inkjet printing;
5. a photocurable clear ink composition for inkjet printing according to any one of 1 to 4, wherein the amide group-containing monofunctional monomer is N-vinyl caprolactam and/or acryloyl morpholine; or
6. a photocurable clear ink composition for inkjet printing according to any one of 1 to 5, wherein a viscosity at 25° C. is 10 mPa·s or lower.

Effects of the Invention

It was proven that, according to the present invention, the specific photocurable clear ink composition for inkjet printing would form a thin film having excellent curability under ultraviolet light, especially ultraviolet light from a light-emitting diode (LED) light source, as well as improved stability under heat, resulting in improved preservation stability of the ink composition.

MODE FOR CARRYING OUT THE INVENTION

The photocurable clear ink composition for inkjet printing proposed by the present invention (hereinafter also referred to as "ink composition proposed by the present invention") is explained below in detail.

The present invention is a photocurable clear ink composition for inkjet printing containing a photopolymerizable compound, a photopolymerization initiator, and a pigment, wherein the average grain size and content of the pigment are examined to achieve a clear ink composition whose visible light transmission factor is 30% or higher.

<Photopolymerizable Compound>

The ink composition proposed by the present invention may contain monofunctional monomers and polyfunctional monomers as the photopolymerizable compound.

(Monofunctional Monomers)

Examples of monofunctional monomers include: alicyclic monofunctional monomers such as methyl methacrylate, butyl methacrylate, 2-ethyl hexyl methacrylate, methyl acrylate, butyl acrylate, 2-ethyl hexyl acrylate, and other alkyl (meth)acrylates, isobornyl (meth)acrylate, phenoxy ethyl (meth)acrylate, 4-t-butyl cyclohexyl (meth)acrylate, dicyclopentenyl (meth)acrylate, and cyclohexyl (meth)acrylate; photopolymerizable monomers such as benzyl methacrylate and other aralkyl (meth)acrylates, butoxy ethyl methacrylate, butoxy ethyl acrylate, and other alkoxy alkyl (meth) acrylates, (meth)acrylic acid esters of triethylene glycol monobutyl ether, dipropylene glycol monoethyl ether, and other polyalkylene glycol monoalkyl ethers, (meth)acrylic acid esters of hexaethylene glycol monophenyl ether and other polyalkylene glycol monoaryl ethers, glycerol (meth) acrylate, and 2-hydroxy ethyl (meth)acrylate; photopolymerizable oligomers such as epoxy (meth)acrylate, polyester (meth)acrylate, and polyether (meth)acrylate; amide and/or amino group-containing monofunctional monomers such as acrylamide, methacrylamide, diethyl acrylamide N,N-dimethyl acrylamide, N,N-dimethyl methacrylamide, N,N-diethyl acrylamide, N,N-diethyl methacrylamide, N,N'-methylene bisacrylamide, N,N-dimethyl aminopropyl acrylamide, N,N-dimethyl aminopropyl methacrylamide, diacetone acrylamide, (meth)acryloyl morpholine, N-vinyl caprolactam, and N-vinyl pyrrolidone; and amino group-containing monofunctional monomers such as aminoethyl (meth)acrylate, N,N-dimethyl aminoethyl (meth)acrylate, N,N-dimethyl aminopropyl (meth)acrylate, and the like. One, two, or more types of these monofunctional monomers may be used.

The monofunctional monomer content is preferably 40 percent by mass or higher, or more preferably 50 percent by mass or higher, in the clear ink composition. Also, the monofunctional monomer content is preferably 90 percent by mass or lower, or more preferably 80 percent by mass or lower, or yet more preferably 75 percent by mass or lower, in the clear ink composition.

If the monofunctional monomer content is lower than 40 percent by mass, the obtained cured coating film may have lower adhesion. If the monofunctional monomer content exceeds 90 percent by mass, on the other hand, the obtained cured coating film may have lower tackiness and abrasion resistance.

Among these monofunctional monomers, preferably an amide group-containing monofunctional monomer and benzyl acrylate are contained by 50 to 75 percent by mass in total quantity in the composition, in order to improve the tackiness and curability of the obtained cured coating film.

Preferred amide group-containing monofunctional monomers include N-vinyl caprolactam and/or acryloyl morpholine, for example.

<Polyfunctional Monomers>

Examples of polyfunctional monomers include acrylated amine compounds having two photopolymerizable functional groups and two amino groups in their molecule, vinyloxy ethoxy ethyl (meth)acrylate, 1,4-butane diol di(meth)acrylate, 1,6-hexane diol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, neopentyl glycol di(meth)acrylate, propylene glycol di(meth)acrylate, dipropylene glycol di(meth)acrylate, tripropylene glycol di(meth)acrylate, ethoxylated 1,6-hexane diol di(meth)acrylate, ethoxylated neopentyl glycol di(meth)acrylate, ethoxylated bisphenol A di(meth)acrylate, cyclohexane dimethanol di(meth)acrylate, alkoxylated hexane diol di(meth)acrylate, alkoxylated cyclohexane dimethanol di(meth)acrylate, alkoxylated di(meth)acrylate, tricyclodecane dimethanol di(meth)acrylate, propoxylated neopentyl glycol di(meth)acrylate, alkoxylated neopentyl glycol di(meth)acrylate, alkoxylated aliphatic di(meth)acrylate, trimethylol propane tri(meth)acrylate, tris(2-hydroxy ethyl) isocyanurate tri(meth)acrylate, pentaerythritol tri(meth)acrylate, ethoxylated trimethylol propane tri(meth)acrylate, propoxylated trimethylol propane tri(meth)acrylate, propoxylated glyceryl tri(meth)acrylate, pentaerythritol tetra(meth)acrylate, ditrimethylol propane tetra(meth)acrylate, ethoxylated pentaerythritol tetra(meth)acrylate, dipentaerythritol penta(meth)acrylate, and the like. One, two, or more types of these polyfunctional monomers may be used.

The polyfunctional monomer content needs to be only 15 percent by mass or higher, but preferably is 20 percent by mass or higher, in the clear ink composition. Also, the polyfunctional monomer content needs to be only 50 percent by mass or lower, but preferably is 35 percent by mass or lower, in the clear ink composition. If the polyfunctional monomer content is lower than 15 percent by mass, the obtained cured coating film tends to have lower abrasion resistance and tackiness. If the polyfunctional monomer content exceeds 50 percent by mass, on the other hand, the obtained cured coating film tends to have lower adhesion.

<Photopolymerization Initiator>

For the photopolymerization initiator, an acylphosphine-based photopolymerization initiator, triazine-based photopolymerization initiator or any other photopolymerization initiator may be adopted.

An acylphosphine-based photopolymerization initiator is a photopolymerization initiator containing the acylphosphine group, while a triazine-based photopolymerization initiator is a photopolymerization initiator having the triazine structure. These photopolymerization initiators have light-absorbing properties across the wavelength spectrum of 450 to 300 nm, and when irradiated by light (UV-LED) having these specific wavelengths, they cause clear ink compositions to polymerize and turn into larger molecules.

Examples of acylphosphine-based photopolymerization initiators include 2,4,6-trimethyl benzoyl diphenyl phosphine oxide, 2,6-dimethoxy benzoyl diphenyl phosphine oxide, 2,6-dichlorobenzoyl diphenyl phosphine oxide, 2,3,5,6-tetramethyl benzoyl diphenyl phosphine oxide, 2,6-dimethyl benzoyl dimethyl phosphine oxide, 4-methyl benzoyl diphenyl phosphine oxide, 4-ethyl benzoyl diphenyl phosphine oxide, 4-isopropyl benzoyl diphenyl phosphine oxide, 1-methyl cyclohexanoyl benzoyl diphenyl phosphine oxide, bis(2,4,6-trimethyl benzoyl)-phenyl phosphine oxide, 2,4,6-trimethyl benzoyl phenyl phosphinic acid methyl ester, 2,4,6-trimethyl benzoyl phenyl phosphinic acid isopropyl ester, bis(2,6-dimethoxy benzoyl)-2,4,4-trimethyl pentyl phosphine oxide, bis(2,6-dimethoxy benzoyl)-2,3,3-trimethyl-pentyl phosphine oxide, and the like. Specific examples include TPO (manufactured by Lamberti) for 2,4,6-trimethyl benzoyl diphenyl phosphine oxide, IRGACURE819 (manufactured by BASF) for bis(2,4,6-trimethyl benzoyl)-phenyl phosphine oxide, and the like.

Examples of triazine-based photopolymerization initiators include 2,4,6-trichloro-s-triazine, 2-phenyl-4,6-bis(trichloromethyl)-s-triazine, 2-(p-methoxy phenyl)-4,6-bis(trichloromethyl)-s-triazine, 2-(p-tolyl)-4,6-bis (trichloromethyl)-s-triazine, 2-pyperonyl-4,6-bis (trichloromethyl)-s-triazine, 2,4-bis(trichloromethyl)-6-styryl-s-triazine, 2-(naphto-1-yl)-4,6-bis(trichloromethyl)-s-triazine, 2-(4-m ethoxy-naphto-1-yl)-4,6-bis (trichloromethyl)-s-triazine, 2,4-trichloromethyl-(pyperonyl)-6-triazine, 2,4-trichloromethyl (4'-methoxy styryl)-6-triazine, and the like.

The photopolymerization initiator content is preferably 5.0 percent by mass or higher, or more preferably 6.0 percent by mass or higher, in the clear ink composition. Also, the photopolymerization initiator content is preferably 15.0 percent by mass or lower, or more preferably 12.0 percent by mass or lower, in the clear ink composition. If the photopolymerization initiator content is lower than 5.0 percent by mass, the clear ink composition may possibly tend to have lower UV-LED curability. Also, the cured coating film becomes resistant to yellowing when the content is at least 5 percent by mass. If the photopolymerization initiator content exceeds 15.0 percent by mass, on the other hand, such additive content is oftentimes excessive because the effect of adding the photopolymerization initiator on improving the curability of the clear ink composition disappears.

It should be noted that preferably the clear ink composition in this embodiment has an acylphosphine-based photopolymerization initiator blended in by 5.0 to 15.0 percent by mass, and that other photopolymerization initiators may be combined to the extent that the performance does not drop. One, two, or more types of the aforementioned photopolymerization initiators may be used, and other photopolymerization initiators, such as thioxanthone-based photopolymerization initiator, α-hydroxy ketone-based photopolymerization initiator, etc., may be combined.

<Inorganic Filler of 1 to 200 nm in Average Grain Size>

The inorganic filler of 1 to 200 nm in average grain size, or preferably 1 to 100 nm in average grain size, used according to the present invention, is preferably an extender pigment, for which preferably silica, aluminum oxide, or calcium carbonate, or more preferably silica or aluminum oxide, is used. It should be noted that any one of these inorganic fillers may be used alone, or two or more types may be combined.

As necessary, these pigments are crushed until their average grain size becomes 1 to 200 nm, or preferably 1 to 100 nm. It should be noted that the term "average grain size" is a value obtained by measurement according to the following method. To be specific, the average grain size was measured using the Microtrac UPA-150 manufactured by Nikkiso.

The inorganic filler of 1 to 200 nm in average grain size is blended into the clear ink composition proposed by the present invention so that it accounts for 0.05 to 5.0 percent by mass, or preferably 0.05 to 3.0 percent by mass. If the blending quantity is smaller than 0.05 percent by mass, the stability under heat cannot be improved and the preservation stability drops, allowing micro-gelling to occur easily. If the blending quantity exceeds 5.0 percent by mass, the result of gravity filtration test or accelerated gravity filtration test becomes unacceptable.

Also, adjusting the average grain size to below 1 nm is not expected to further improve the stability under heat, and manufacturing an inorganic filler of such extremely fine grains is difficult.

In addition, if the average grain size exceeds 200 nm, dispersing the grains uniformly in the ink composition becomes difficult, and also the stability under heat cannot be improved and the preservation stability drops, allowing micro-gelling to occur easily. Additionally, the result of accelerated gravity filtration test becomes unacceptable.

Also, the type and blending quantity of the inorganic filler to be added are determined so that, in light of the fact that the ink composition proposed by the present invention is a clear ink, the visible light transmission factor of the clear ink becomes 30% or higher, or preferably 50% or higher, or more preferably 70% or higher, or most preferably 90% or higher.

(Pigment Dispersant)

Also, the photocurable clear ink composition for inkjet printing proposed by the present invention may contain a pigment dispersant, if necessary.

The pigment dispersant is used to improve the dispersibility of the pigment and the preservation stability of the photocurable clear ink composition for inkjet printing proposed by the present invention and, although any traditionally used pigment dispersants may be used without limitation; among those, preferably a polymer dispersant is used. Such pigment dispersant may be a carbodiimide-based dispersant, polyester amine-based dispersant, fatty acid amine-based dispersant, denatured polyacrylate-based dispersant, denatured polyurethane-based dispersant, multi-chain polymeric nonionic dispersant, polymeric ion active agent, etc. Any of these pigment dispersants may be used alone, or two or more types may be mixed together.

Preferably the pigment dispersant is contained by 1 to 200 parts by mass when the total quantity of pigment used represents 100 parts by mass. If the pigment dispersant content is lower than 1 part by mass, the pigment dispersibility and the preservation stability of the ink composition proposed by the present invention may drop. On the other hand, while the content may exceed 200 parts by mass, doing so may not produce any difference in effect. A more preferable lower limit of the pigment dispersant content is 5 parts by mass, while a more preferable upper limit of it is 60 parts by mass.

(Ketone Resin)

The photocurable clear ink composition for inkjet printing proposed by the present invention may contain a ketone resin to prevent tackiness.

The ketone resin is not limited in any way so long as it dissolves in the aforementioned photopolymerizable compound, and any known ketone resin may be used.

The ketone resin is preferably a hydroxyl group-containing ketone resin, where specific examples include: (1) hydroxyl group-containing ketone resins, each obtained by hydrogenating a ketone resin which was in turn obtained by reacting a ketone group-containing compound such as acetophenone or other aromatic ketone compound, cyclohexane, trimethyl cyclohexanone, or other alicyclic ketone compound, with formaldehyde or other aldehyde compound; and (2) hydroxyl group-containing urethane-denatured ketone resins, each obtained by reacting a ketone resin containing a substituent group that can react with isocyanate compounds, with an isophorone diisocyanate or other polyisocyanate compound. Any of the foregoing may be used alone, or two or more types may be combined.

These ketone resins are commercially available, where specific examples include SK and PZZ-1201 manufactured by Evonik, and the like.

If the aforementioned ketone resin is to be contained, preferably its content falls between 5.0 and 15.0 percent by mass in the photocurable clear ink composition for inkjet printing, in order to prevent tackiness.

The clear ink composition proposed by the present invention may be prepared by any traditionally known method.

For example, the clear ink composition may be prepared by mixing, under agitation, all of the aforementioned components and the optional components described below. The viscosity of the obtained clear ink composition is adjusted to 1.0 mPa·s or higher at 25° C. Also, the viscosity of the clear ink composition is 10.0 mPa·s or lower, or preferably adjusted to 5.0 mPa·s or lower, at 25° C. Such clear ink composition demonstrates excellent discharge stability when printed with inkjet recording devices. In particular, such clear ink composition demonstrates excellent discharge stability, at normal temperature, from printheads of inkjet recording devices that support low-viscosity inks to achieve energy savings, higher speed, and higher definition.

Also, the clear ink composition in this embodiment may be printed and cured by any traditionally known method. For example, the clear ink composition may be printed and cured by discharging it onto a base material or images/text printed on a base material (hereinafter also simply referred to as "base material, etc."), and then exposing to UV-LED the coating film created by the clear ink composition that has landed on the base material, etc., and curing it.

For the base material, any material traditionally used with UV-LED-curable clear ink compositions for inkjet printing may be used without limitation. Specific examples include paper, plastic film, capsule, metal foil, glass, etc. Among those, vinyl chloride, polycarbonate, and other materials used for flooring are preferred.

The clear ink composition in this embodiment is supplied to a printhead supporting low-viscosity inks, of an inkjet recording device (inkjet printer), and discharged onto a base material from the printhead, for example. The discharged clear ink composition lands on the base material so that the film thickness becomes 1 to 60 μm, for example. The landed clear ink composition is irradiated with UV-LED and cured as deemed appropriate. It should be noted that, for the inkjet recording device with which to print the clear ink composition in this embodiment, any traditionally known inkjet recording device is used. If a continuous-type inkjet recording device is used, preferably a conductivity-adding agent is also added to the clear ink composition to properly adjust its conductivity level.

<Optional Components of Clear Ink Composition>

Next, the optional components that are preferably contained in the clear ink composition in this embodiment are explained. In addition to the aforementioned components, other optional components may be blended into the clear ink composition in this embodiment, as deemed appropriate, to express various functions. For example, the clear ink composition may contain surface-active agent, solvent, dye, other pigment such as coloring pigment, sensitizer, pigment dispersant, and various additives.

(Surface Active Agent)

A surface-active agent may be blended in, as deemed appropriate according to the printhead of the inkjet recording device that uses the clear ink composition, in order to improve the discharge stability of the clear ink composition, and the like. Examples of surface-active agents include silicone-based surface-active agents, etc., that have been used favorably with photocurable clear ink compositions for inkjet printing. Specific examples of silicone-based surface-active agents include polyether-denatured silicone oil, polyester-denatured polydimethyl siloxane, polyester-denatured methyl alkyl polysiloxane, etc. Two or more of these surface-active agents may be combined.

Preferably the surface-active agent content is 0.005 percent by mass or higher in the clear ink composition. Also, preferably the surface-active agent content is 1.0 percent by mass or lower in the clear ink composition. If the surface-active agent content is lower than 0.005 percent by mass, the clear ink composition has high surface tension and its discharge stability tends to drop. If the surface-active agent content exceeds 1.0 percent by mass, on the other hand, air bubbles tend to form in the clear ink composition and its discharge stability tends to drop.

(Solvent)

A solvent may be blended into the clear ink composition, as deemed appropriate. Examples of solvents include ester-based organic solvents, ether-based organic solvents, ether-ester-based organic solvents, ketone-based organic solvents, aromatic hydrocarbon solvents, nitrogen-containing organic solvents, etc. Also, examples of solvents include those whose boiling point under normal pressure ($1.013 \times 10^2$ kPa) is 150 to 220° C.

Preferably use of organic solvent is kept to a minimum in view of the curability of the clear ink composition, environmental issues, etc. For this reason, the organic solvent content is preferably 5 percent by mass or lower, or more preferably 2 percent by mass or lower, or yet more preferably zero, in the clear ink composition, (Other Pigments)

To obtain the clear ink composition in different colors, pigments other than the inorganic filler of 1 to 200 nm in average grain size may be blended in as deemed appropriate. These pigments are preferably ones traditionally used with normal photocurable clear ink compositions for inkjet printing, or specifically organic pigments or inorganic fillers that disperse well in the clear ink composition and offer excellent weather resistance. To be specific, examples of the aforementioned organic pigments include dye lake pigments, azo, benzimidazolone, phthalocyanine, quinacridone, anthraquinone, dioxazine, indigo, thioindigo, perylene, perinone, diketopyrrolopyrrole, isoindolinone, nitro, nitrone, flavanthrone, quinophthalone, pyranthrone, indanthrone, and other pigments. Two or more of these pigments may be combined.

However, it should be noted that, when these pigments are combined, doing so must not interfere with the effect achieved by blending in the inorganic filler of 1 to 200 nm in average grain size.

(Sensitizer)

The photocurable clear ink composition for inkjet printing proposed by the present invention may further use a photosensitizer (compound) having light absorbing properties in the primarily UV wavelength spectrum of 400 nm and longer and manifesting a function to sensitize the curing reaction through light of wavelengths in this range, in order to promote the curability under ultraviolet light from a light-emitting diode (LED) source.

It should be noted that "manifesting a function to sensitize the curing reaction through light of 400 nm and longer wavelengths" above means that light-absorbing properties manifest in the wavelength spectrum of 400 nm and longer. Use of such sensitizer allows for promoting the LED curability of the photocurable clear ink composition for inkjet printing proposed by the present invention.

The aforementioned photosensitizer is an anthracene-based sensitizer, thioxanthone-based sensitizer, etc., of which a thioxanthone-based sensitizer is preferred. Any of these may be used alone, or two or more types may be combined.

Specific examples include 9,10-dibutoxy anthracene, 9,10-diethoxy anthracene, 9,10-dipropoxy anthracene, 9,10-bis(2-ethyl hexyloxy) anthracene and other anthracene-based sensitizers; and 2,4-diethyl thioxanthone, 2-isopropyl thioxanthone, 4-isopropyl thioxanthone, and other thioxanthone-based sensitizers. Representative commercial products include DBA and DEA (manufactured by Kawasaki Kasei Chemicals) for anthracene-based sensitizers, and DETX and ITX (manufactured by LAMBSON) for thioxanthone-based sensitizers, and the like, for example. It should be noted that preferably use of thioxanthone-based sensitizers is avoided in order to prevent discoloration.

(Various Additives)

Various additives that may be blended in as deemed appropriate include thermocurable resin, photostabilizer, surface-treatment agent, viscosity-reducing agent, antioxidant, antiaging agent, crosslinking promoter, polymerization inhibitor, plasticizer, preservative, pH-adjusting agent, defoaming agent, moisturizing agent, etc.

As described above, the clear ink composition in this embodiment contains a monofunctional monomer by 40 to 90 percent by mass, a polyfunctional monomer by 15 to 50 percent by mass, and an acylphosphine-based photopolymerization initiator by 5 to 15 percent by mass. Such clear ink composition demonstrates excellent UV-LED curability.

Also, the obtained cured coating film has excellent adhesion to the base material, and abrasion resistance.

EXAMPLES

The present invention is explained below in further detail using examples; however, it should be noted that the present invention is not limited to these examples. It should also be noted that, unless otherwise specified, "%" indicates "percent by mass," while "part" indicates "part by mass."

The following materials are used in the examples and comparative examples below.

<Pigment Dispersant>
Ajisper (registered trademark) PB821 (manufactured by Ajinomoto Fine-Techno)
<Photopolymerizable Compounds>
Benzyl acrylate (manufactured by Osaka Organic Chemical Industry)
Vinyl caprolactam 1,6-hexane diol diacrylate
<Photopolymerization Initiator>
TPO: 2,4,6-trimethyl benzoyl diphenyl phosphine oxide (manufactured by LAMBERTI)
<Additives>
BYK-315 (silicone additive, manufactured by BYK Chemie)
UV-5=dioctyl maleate (manufactured by Kromachem)
UV-22=quinone polymerization inhibitor (manufactured by Kromachem)

<Inorganic Oxides>
Silica (20 nm in grain size, NANOCRYL C 140, manufactured by Evonik, dispersed in 1,6-hexane diol diacrylate, solids content 50%)
Aluminum oxide (80 nm in grain size, AEROXIDE Alu-C, manufactured by Nippon Aerosil, dispersed in-house, solids content 10%)
<Preparation of Aluminum Oxide Dispersion>

10 parts by mass of AEROXIDE Alu-C, 1 part by mass of PB-821 as a dispersant, and 89 parts by mass of benzyl acrylate, were kneaded for 60 minutes in a Ready Mill (bead diameter: 0.2 nm, filling rate: 50%), to obtain an aluminum oxide dispersion of 4.9 cps in viscosity, 80 nm in grain size distribution, and 10% in solids content.

Examples 1 to 8 and Comparative Examples 1 to 3

[Preparation of Photocurable Clear Ink Compositions for Inkjet Printing]

The components were blended according to the blending compositions (percent by mass) in Table 1 and mixed under agitation, to obtain the photocurable clear ink compositions for inkjet printing in Examples 1 to 8 and Comparative Examples 1 to 3.

[Viscosity Measurement of Photocurable Clear Ink Compositions for Inkjet Printing]

The photocurable clear ink compositions for inkjet printing obtained in Examples 1 to 8 and Comparative Examples 1 to 3 were measured for viscosity using a type-E viscometer (product name: RE100L Viscometer, manufactured by Toki Sangyo) under the conditions of 25° C. in temperature and 500 rpm in rotor speed.

The photocurable clear ink compositions for inkjet printing in Examples 1 to 8 and Comparative Examples 1 to 3 had viscosities of approx. 7 mPa·s.

<Visible Light Transmission Factor>

Visible light transmission factor was measured using a UV/visible spectrophotometer (product name: UV-Vis Recording Spectrophotometer, manufactured by Shimadzu Corporation).

<Gravity Filtration Test>

The photocurable clear ink compositions for inkjet printing in Examples 1 to 8 and Comparative Examples 1 to 3 were tested immediately after manufacture (initial state) and after one month of preservation at 60° C., where 40 g was sampled from each photocurable clear ink composition for inkjet printing and passed through a SPC filter holder (Φ25 mm, manufactured by Sibata Scientific Technology) over a 2600 mesh, to measure the passing-through level.

TABLE 1

| Composition | | | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|---|---|
| Inorganic fillers | Silica (grain size 20 nm, NANOCRYL C 140, manufactured by Evonik, solids content 50%) | Silica | 0.05 | 0.5 | 1.0 | 1.5 | 5.0 | — | — | — | — | — | — |
| | | 1,6-hexane diol diacrylate | 0.05 | 0.5 | 1.0 | 1.5 | 5.0 | — | — | — | — | — | — |
| | Aluminum oxide (grain size 80 nm, AEROXIDE Alu-C, manufactured by Nippon Aerosil, dispersed in-house, solids content 10%) | Aluminum oxide | — | — | — | — | — | 0.1 | 0.3 | 0.5 | 0.03 | 5.5 | — |
| | | Benzyl acrylate | — | — | — | — | — | 0.9 | 2.7 | 4.5 | 0.27 | 49.5 | — |
| | Aluminum oxide (grain size over 200 nm, | Aluminum oxide | — | — | — | — | — | — | — | — | — | — | 0.2 |

TABLE 1-continued

|  | Composition |  | Example 1 | 2 | 3 | 4 | 5 | 6 | 7 | 8 | Comparative Example 1 | 2 | 3 |
|---|---|---|---|---|---|---|---|---|---|---|---|---|---|
|  | AEROXIDE Alu-C, manufactured by Nippon Aerosil, dispersed in-house, solids content 10% | Benzyl acrylate | — | — | — | — | — | — | — | — | — | — | 1.8 |
| Photopoly-merizable compounds | Vinyl caprolactam |  | 9 | 9 | 9 | 9 | 9 | 9 | 9 | 9 | 9 | 9 | 9 |
|  | Benzyl acrylate |  | 55 | 54.1 | 53.1 | 52.1 | 45.1 | 54.1 | 52.1 | 50.1 | 54.8 | 0.1 | 53.1 |
| Ketone resin | SK resin/V#160 (solids content 40%) | SK resin | 8.4 | 8.4 | 8.4 | 8.4 | 8.4 | 8.4 | 8.4 | 8.4 | 8.4 | 8.4 | 8.4 |
|  |  | Benzyl acrylate | 12.6 | 12.6 | 12.6 | 12.6 | 12.6 | 12.6 | 12.6 | 12.6 | 12.6 | 12.6 | 12.6 |
| Initiator | TPO |  | 12 | 12 | 12 | 12 | 12 | 12 | 12 | 12 | 12 | 12 | 12 |
| Additives | UV5 |  | 1.9 | 1.9 | 1.9 | 1.9 | 1.9 | 1.9 | 1.9 | 1.9 | 1.9 | 1.9 | 1.9 |
|  | UV22 |  | 0.5 | 0.5 | 0.5 | 0.5 | 0.5 | 0.5 | 0.5 | 0.5 | 0.5 | 0.5 | 0.5 |
|  | BYK-315 (solids content 25%) |  | 0.5 | 0.5 | 0.5 | 0.5 | 0.5 | 0.5 | 0.5 | 0.5 | 0.5 | 0.5 | 0.5 |
| Total |  |  | 100.0 | 100.0 | 100.0 | 100.0 | 100.0 | 100.0 | 100.0 | 100.0 | 100.0 | 100.0 | 100.0 |
| Evaluation | Gravity filtration test (initial state) |  | 7'42" | 8'13" | 7'50" | 8'03" | 7'57" | 8'19" | 8'21" | 7'39" | 7'21" | x | 13'35" |
|  | Gravity filtration test (after one month of acceleration at 60° C.) |  | 8'03" | 8'21" | 8'01" | 8'24" | 8'18" | 8'27" | 8'33" | 8'01" | x | x | x |
|  | Visible light transmission factor (680 nm) |  | 95 | 98 | 94 | 95 | 98 | 91 | 90 | 78 | 97 | 8 | 45 |

According to Examples 1 to 8, which are examples in line with the present invention, despite the fact that the clear inks were high in visible light transmission factor, their storage stability was almost unchanged as compared to that in initial state measured immediately after manufacture, even after one month of acceleration (preservation) at 60° C. In contrast, the clear ink in Comparative Example 1 containing an insufficient content of inorganic filler, to which, in Comparative Example 2, an inorganic filler was added excessively, and to which, in Comparative Example 3, an inorganic filler of larger average grain size was added, degraded after having been kept for one month at 60° C. The clear inks to which an inorganic filler was added excessively or whose inorganic filler was too large, already had poor storage stability immediately after manufacture.

What is claimed is:

1. A photocurable clear ink composition for inkjet printing which contains a photopolymerizable compound, a photopolymerization initiator, an amino and/or acid group-containing pigment dispersant, an inorganic filler of 1 to 200 nm in average grain size accounting for 0.05 to 3.0 percent by mass in the composition, and a ketone resin, and whose visible light transmission factor as measured at 680 nm is 30% or higher.

2. The photocurable clear ink composition for inkjet printing according to claim 1, wherein the inorganic filler is silica and/or aluminum oxide.

3. The photocurable clear ink composition for inkjet printing according to claim 1, wherein an amide group-containing monofunctional monomer and benzyl acrylate are contained, as the photopolymerizable compound, by 50 to 75 percent by mass in total quantity in the photocurable clear ink composition for inkjet printing.

4. The photocurable clear ink composition for inkjet printing according to claim 3, wherein the amide group-containing monofunctional monomer is N-vinyl caprolactam and/or acryloyl morpholine.

5. The photocurable clear ink composition for inkjet printing according to claim 1, wherein a viscosity at 25° C. is 10 mPa·s or lower.

6. The photocurable clear ink composition for inkjet printing according to claim 2, wherein an amide group-containing monofunctional monomer and benzyl acrylate are contained, as the photopolymerizable compound, by 50 to 75 percent by mass in total quantity in the photocurable clear ink composition for inkjet printing.

7. The photocurable clear ink composition for inkjet printing according to claim 6, wherein the amide group-containing monofunctional monomer is N-vinyl caprolactam and/or acryloyl morpholine.

8. The photocurable clear ink composition for inkjet printing according to claim 2, wherein a viscosity at 25° C. is 10 mPa·s or lower.

9. The photocurable clear ink composition for inkjet printing according to claim 3, wherein the amide group-containing monofunctional monomer is N-vinyl caprolactam and/or acryloyl morpholine.

10. The photocurable clear ink composition for inkjet printing according to claim 3, wherein a viscosity at 25° C. is 10 mPa·s or lower.

11. The photocurable clear ink composition for inkjet printing according to claim 4, wherein a viscosity at 25° C. is 10 mPa·s or lower.

12. The photocurable clear ink composition for inkjet printing according to claim 6, wherein the amide group-containing monofunctional monomer is N-vinyl caprolactam and/or acryloyl morpholine.

* * * * *